Dec. 19, 1950     J. T. BULLOCK     2,534,543
LIGHT CONCENTRATING REFLECTOR CAMERA
Original Filed Sept. 16, 1946
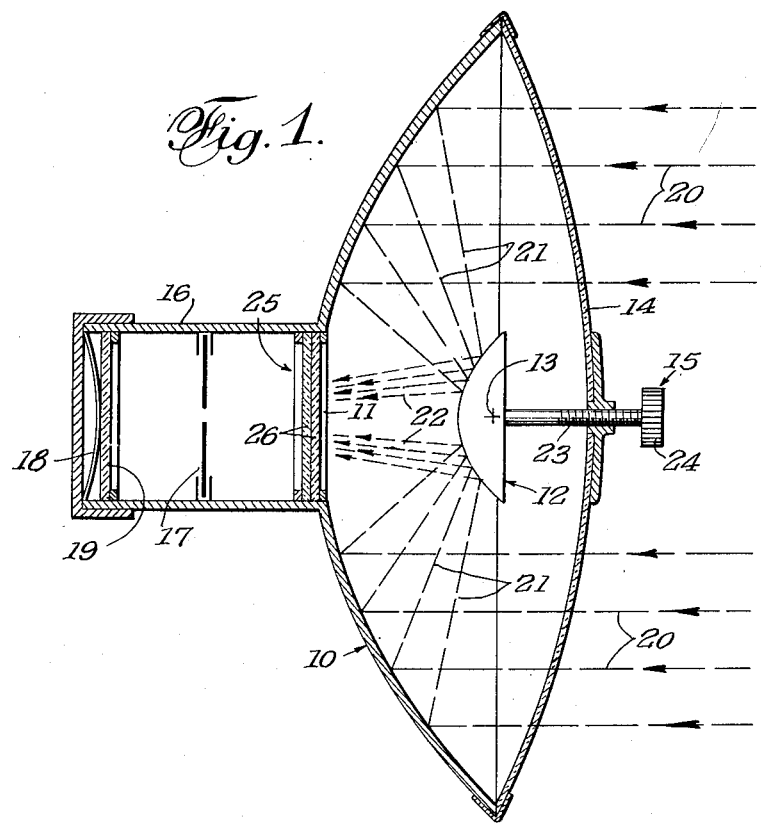
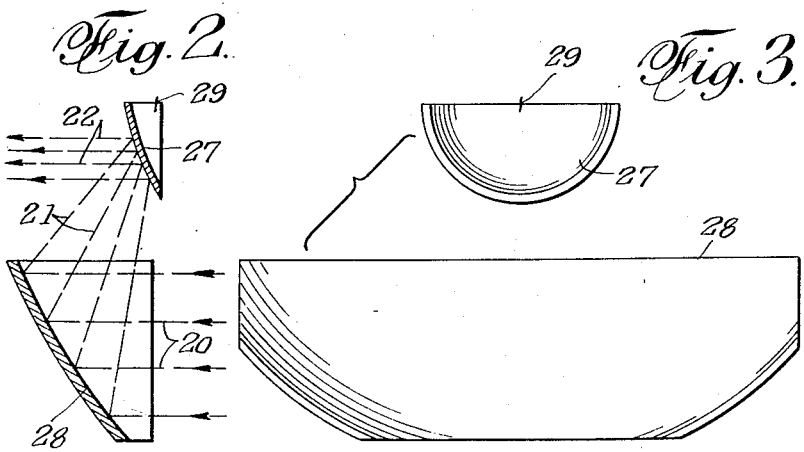
Inventor
JESSE T. BULLOCK
C. G. Stratton
Attorney Patented Dec. 19, 1950

2,534,543

UNITED STATES PATENT OFFICE 2,534,543

LIGHT CONCENTRATING REFLECTOR CAMERA

Jesse T. Bullock, Kansas City, Kans., assignor of one-third to Andrew J. Bramlette, Los Angeles, and one-third to William R. Harriman, Hondo, Calif.

Original application September 16, 1946, Serial No. 697,205. Divided and this application July 21, 1947, Serial No. 762,379

2 Claims. (Cl. 95—11)

This invention relates to cameras and like devices and contemplates the provision of novel optical means for effecting efficient transmission and concentration of light upon a light sensitive film or plate. This application is a division of my pending application entitled "Ray Transmitting and Concentrating Devices," Serial No. 697,205, and filed September 16, 1946 and now abandoned.

The present invention has for an object to provide a camera or the like embodying novel and improved reflecting means for focusing light upon a film within the camera.

Another object of the invention is to provide a camera or similar device such as a photo-enlarger and to embody therein paraboloid light reflecting means for concentrating and focusing light upon a sensitized film or plate within the camera.

A further object of the invention is to provide a camera as indicated, in which the paraboloid reflecting means is adjustable.

My invention has also for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 1 is a semi-diagrammatic cross-sectional view of a camera embodying features of the present invention and adjusted to transmit a converging light beam.

Fig. 2 is a cross-sectional view showing a modification of the paraboloid reflecting means employed in the camera.

Fig. 3 is a front view thereof.

The mentioned pending application discloses means involving the principle of receiving rays on the concave surface of a centrally apertured parabolic reflector, reflecting said rays onto the convex surface of a smaller parabolic for transmission of said rays in resulting concentrated form through the mentioned aperture. Thus, as explained in said application, incoming parallel rays can be transmitted as a parallel beam or as a converging beam, or incoming converging or diverging rays can be transmitted as a parallel beam by the simple relative adjustment of the positions of the reflectors. By positioning the reflectors so their focal points coincide, parallel ray transmission is effected and by adjusting said reflectors, relatively, either converging or diverging ray transmission is obtained. The principles outlined, further, contemplate slight modification of either reflector for obtaining the type of ray transmission desired.

In the embodiment of the invention which is illustrated in Fig. 1, the camera comprises, generally, a larger concave parabolic reflector 10 having a central aperture or opening 11, a smaller convex parabolic reflector 12 normally positioned so that its focal point and that of reflector 10 coincide at a point 13, a transparent cover 14 arranged to enclose both reflectors to protect them, adjustable means 15 carried by said lens for moving reflector 12 toward and from reflector 10 and thereby varying the character of the light beam entering the aperture 11, a tube 16 extending rearward of said aperture and enclosing the same, a conventional camera shutter 17 within said tube intermediate its length, means 18 for removably supporting a light sensitive film or plate 19 rearward of said shutter, and means 25 for controlling the aperture 11 and preferably located adjacent thereto.

The reflector 10 is truly parabolic or somewhat modified as outlined in the stated principles of the invention. Its effective concave surface is adapted to receive light rays 20 and reflect them onto the convex face of reflector 12. The latter reflector is simply a smaller replica of reflector 10 except that a central aperture is omitted. The point 13, being the common focal point of the reflectors, the parallel rays 20, reflected as rays 21 toward the smaller reflector 12, will be reflected by the latter, as a parallel beam 22, through opening 11.

The means 15, which comprises a screw 23 and an operating head 24 thereon, passes through cover 14 and carries reflector 12. Manipulation of head 24 causes movement of reflector 12 toward and from reflector 10 to change the beam 22 to a converging or diverging beam, as the case may be. Fig. 1 shows adjustment of reflector 12 to provide a converging light beam 22.

The shutter 17 and the film or plate supporting means 18 may be generally conventional for such means. The means 25 may comprise relatively rotatable light polarizing filters 26 for controlling the amount or degree of light entering tube 16 through aperture 11.

The camera above described may be variously modified. Instead of the completely circular reflector shown, only such portions thereof that are necessary to transmit light, may be provided. As seen in Figs. 2 and 3, the convex reflector 27 may comprise a suitable portion or segment of a completely circular reflector and the concave reflector 28 may embody only such portions that receive light rays transmitted by reflector 27. Accordingly, the camera housing can be more compactly designed about such reflector portions. It will be noted that the point 29 which is the common focal point of reflectors 27 and 28 is located on the axis of generation of the peripheral edges of said reflectors.

While I have illustrated and described what I now regard as the preferred embodiments of my invention, the construction is, of course, subject to modifications without departing from the spirit and scope of my invention. I therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. A camera comprising, in combination, a concave parabolic reflector having a central light-passing opening, a smaller convex parabolic reflector located centrally within the concave reflector and in front of the opening therein, a transparent cover completely enclosing the light-receiving surface of the concave reflector and, thereby, enclosing the convex reflector, adjusting means connected to the latter reflector and carried by and extending through said cover for effecting adjustment of the two reflectors, relatively, light received by the concave reflector being reflected to the convex reflector and transmitted by the latter through the mentioned opening in the former, light-polarizing means across said opening, and a shutter and film-holding assembly in the path of the polarized light passed by the light-polarizing means.

2. A camera comprising, in combination, a concave parabolic reflector having a central light-passing opening, a smaller convex parabolic reflector located centrally within the concave reflector and in front of the opening therein, a transparent cover completely enclosing the light-receiving surface of the concave reflector and, thereby, enclosing the convex reflector, adjusting means connected to the latter reflector and carried by and extending through said cover for effecting adjustment of the two reflectors, relatively, light received by the concave reflector being reflected to the convex reflector and transmitted by the latter through the mentioned opening in the former, light-polarizing means across said opening, a tubular housing extending from the concave reflector in the direction of light transmitted by the convex reflector and aligned with the opening in the concave reflector, a removable retainer engaged with the end of the housing for film disposed within said housing, and a shutter in the housing between the film and light-polarizing means.

JESSE T. BULLOCK.

REFERENCES CITED

The following references are of record in the file of this patent:

UNITED STATES PATENTS

| Number | Name | Date |
|---|---|---|
| 697,738 | Miller | Apr. 15, 1902 |
| 753,351 | Beidler | Mar. 1, 1904 |
| 2,282,869 | Johnson et al. | May 12, 1942 |
| 2,336,379 | Warmisham | Dec. 7, 1943 |
| 2,403,660 | Hayward | July 9, 1946 |
| 2,413,286 | Buchele | Dec. 31, 1946 |
| 2,430,595 | Young | Nov. 11, 1947 |

FOREIGN PATENTS

| Number | Country | Date |
|---|---|---|
| 3,058 | Great Britain | Nov. 19, 1903 |
| 29,282 | Great Britain | of 1909 |
| 410,263 | France | Mar. 10, 1910 |